United States Patent
Bradley et al.

(10) Patent No.: US 9,197,872 B2
(45) Date of Patent: Nov. 24, 2015

(54) MANAGING STORED CONTENT

(71) Applicant: Comcast Cable Communications, LLC, Philadelphia, PA (US)

(72) Inventors: Bruce Bradley, Wayne, PA (US); James Barkley, Downingtown, PA (US); Robert Knee, Lansdale, PA (US); Mark McKelvey, Wayne, PA (US)

(73) Assignee: Comcast Cable Communications, LLC., Philadelphia, PA (US)

( * ) Notice: Subject to any disclaimer, the term of this patent is extended or adjusted under 35 U.S.C. 154(b) by 113 days.

(21) Appl. No.: 13/773,359

(22) Filed: Feb. 21, 2013

(65) Prior Publication Data

US 2014/0233923 A1   Aug. 21, 2014

(51) Int. Cl.

| | |
|---|---|
| *H04N 5/76* | (2006.01) |
| *H04N 9/80* | (2006.01) |
| *H04N 9/79* | (2006.01) |
| *H04N 5/782* | (2006.01) |
| *H04N 21/258* | (2011.01) |
| *H04N 21/2747* | (2011.01) |
| *H04N 21/4147* | (2011.01) |
| *H04N 21/433* | (2011.01) |
| *H04N 21/4335* | (2011.01) |
| *H04N 21/442* | (2011.01) |
| *H04N 21/45* | (2011.01) |
| *H04N 21/466* | (2011.01) |
| *H04N 21/472* | (2011.01) |
| *H04N 21/485* | (2011.01) |
| *H04N 21/488* | (2011.01) |
| *H04N 21/6543* | (2011.01) |
| *H04N 21/658* | (2011.01) |

(52) U.S. Cl.
CPC . *H04N 9/79* (2013.01); *H04N 5/76* (2013.01); *H04N 5/782* (2013.01); *H04N 21/25891* (2013.01); *H04N 21/2747* (2013.01); *H04N 21/4147* (2013.01); *H04N 21/4334* (2013.01); *H04N 21/4335* (2013.01); *H04N 21/4424* (2013.01); *H04N 21/4532* (2013.01); *H04N 21/4667* (2013.01); *H04N 21/47214* (2013.01); *H04N 21/485* (2013.01); *H04N 21/4882* (2013.01); *H04N 21/6543* (2013.01); *H04N 21/6582* (2013.01)

(58) Field of Classification Search
USPC .................................. 386/239–262, 291–299
See application file for complete search history.

(56) References Cited

U.S. PATENT DOCUMENTS

| | | | |
|---|---|---|---|
| 7,512,318 B2 * | 3/2009 | Tanikawa ...................... 386/291 |
| 2002/0012517 A1 * | 1/2002 | Ichioka et al. .................. 386/46 |
| 2002/0097986 A1 * | 7/2002 | Matoba et al. .................. 386/83 |
| 2005/0160462 A1 * | 7/2005 | Shikata et al. .................. 725/58 |
| 2005/0289594 A1 * | 12/2005 | Numakami et al. ............. 725/45 |
| 2006/0222325 A1 * | 10/2006 | Ellis .................................. 386/83 |
| 2008/0065659 A1 * | 3/2008 | Watanabe et al. ............. 707/100 |

(Continued)

*Primary Examiner* — Hung Dang
(74) *Attorney, Agent, or Firm* — Banner & Witcoff, Ltd.

(57) ABSTRACT

A content management system may assist users in managing the storage of various pieces of content, such as television programs, that the user has recorded. The system may track the user's consumption behavior, determining which programs the user regularly watches and which programs the user regularly ignores, and use that consumption behavior to determine which recorded programs to recommend for relocation to a remote storage, or for outright deletion. The system can also use the behavior information to modify new recording requests, such as directing a new request to a secondary storage location if it is unlikely that the user will view the recording.

20 Claims, 6 Drawing Sheets

(56) References Cited

U.S. PATENT DOCUMENTS

| | | | |
|---|---|---|---|
| 2008/0101763 A1* | 5/2008 | Bhogal et al. | 386/83 |
| 2009/0142042 A1* | 6/2009 | Branam | 386/124 |
| 2009/0274448 A1* | 11/2009 | Kinoshita et al. | 386/124 |
| 2010/0138865 A1* | 6/2010 | Rai et al. | 725/44 |
| 2012/0030721 A1* | 2/2012 | Smith et al. | 725/88 |

* cited by examiner

MANAGING STORED CONTENT

BACKGROUND

With the proliferation of digital video recorders (DVRs) and the like, users have the ability to create vast libraries of stored content. However, the storage space for content is finite, and there remains a need to assist users in using their storage space more effectively.

SUMMARY

The following summary is for illustrative purposes only, and is not intended to limit or constrain the detailed description.

In some embodiments, a system may receive a user request to record content, and determine the user's consumption habit of previous recordings relating to the requested recording, and adjust the requested recording based on the consumption habit. The adjustment can include directing the recording to a different storage location, and/or adjusting the frequency of the recording. Adjusting the frequency can include, for example, converting a series recording from a mode that records all episodes to a mode that only records the new episodes, or converting a series recording to a one-time episode recording.

The consumption habit can include the time elapsed otherwise between the recording of the content and when the user got around to viewing or consuming the content. If the content is part of a series, then the consumption habit can include an average elapsed time, indicating the average time it has taken the user to get around to watching previous recorded episodes of the series.

In addition to determining how long it typically takes the user to get around to watching a recorded episode of a series, the system may also determine how likely the user is to watch the recorded episode at all, for example, by determining a ratio of the number of watched episodes of the series versus the number of recorded episodes of the series.

In some embodiments, the system may assist the user in managing stored content by reminding the user to watch unwatched content that is taking up space in the user's allocated storage (or any storage space within a network). For example, the system may monitor media, e.g., news, sources to identify keywords for trending popular topics, actors, movies, etc., and can compare the keywords with the user's list of recorded content to determine whether the user has any unwatched recorded content that may relate to the trending popular topics. If such an unwatched recording is found, then the system may deliver a reminder to the user to watch the program or otherwise consume content. The reminder may be delivered in a manner preferred by the user.

If the user has multiple matching unwatched programs, the system can prioritize one over the other based on which has the more matches. Also, the system can minimize the number of reminders by first requiring a minimum number of matches before sending the reminder.

The system may also help in reducing and/or otherwise removing a user's stored content. The system can identify the recordings that the user has not yet watched, and evaluate them based on various criteria to identify one or more relocation options, and then display a list of the recordings with the identified relocation options. The evaluation criteria can include, for example, the user's past consumption behavior of similar programs, a determination of whether the user has already watched a more recent episode in the series (for programs in a series), the age of the recording or how long the recording has been waiting for the user to view it, the topicality of the programs and how they relate to currently popular trending topics, and whether the same recorded content is available elsewhere, e.g., for on demand streaming.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
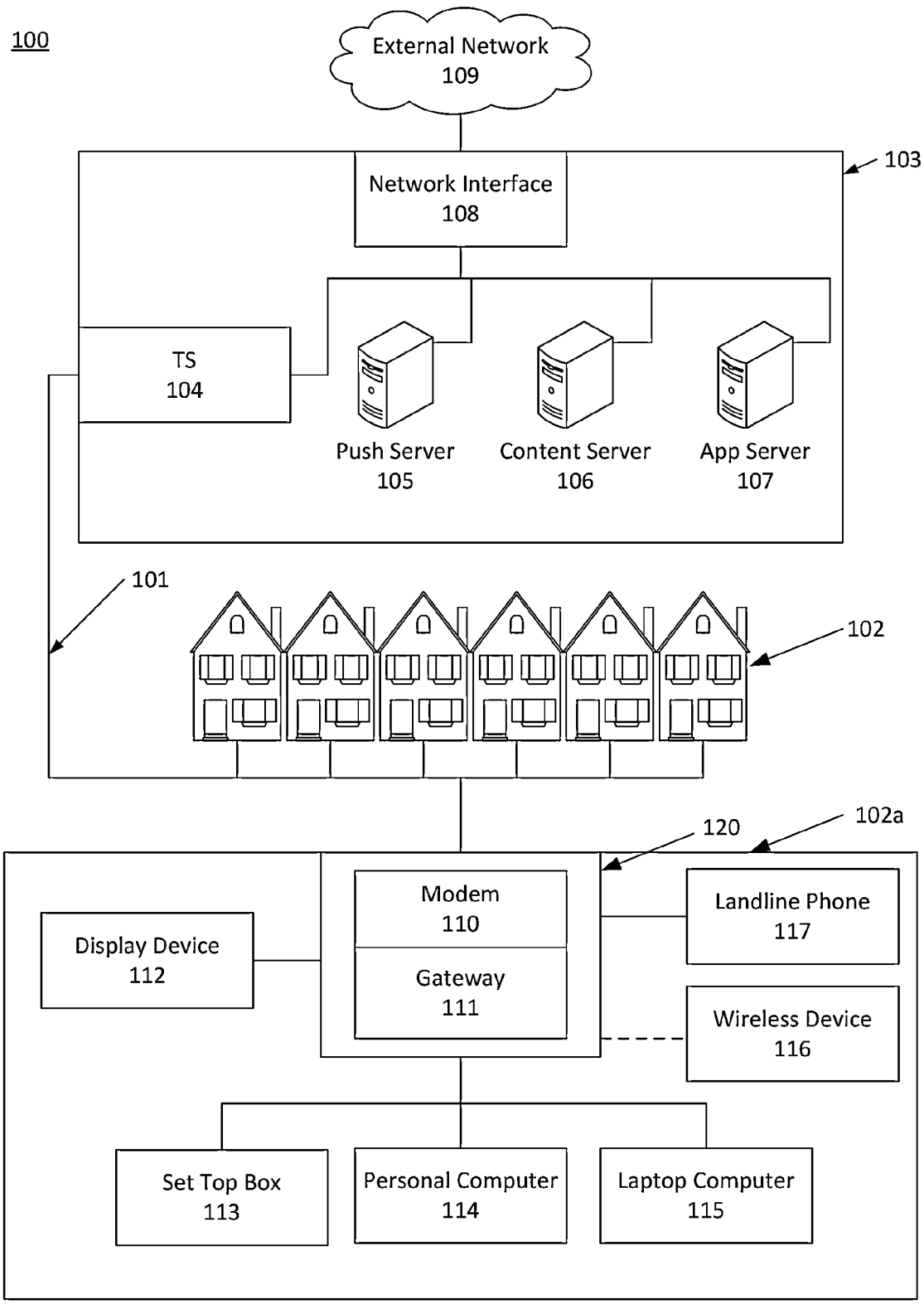
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
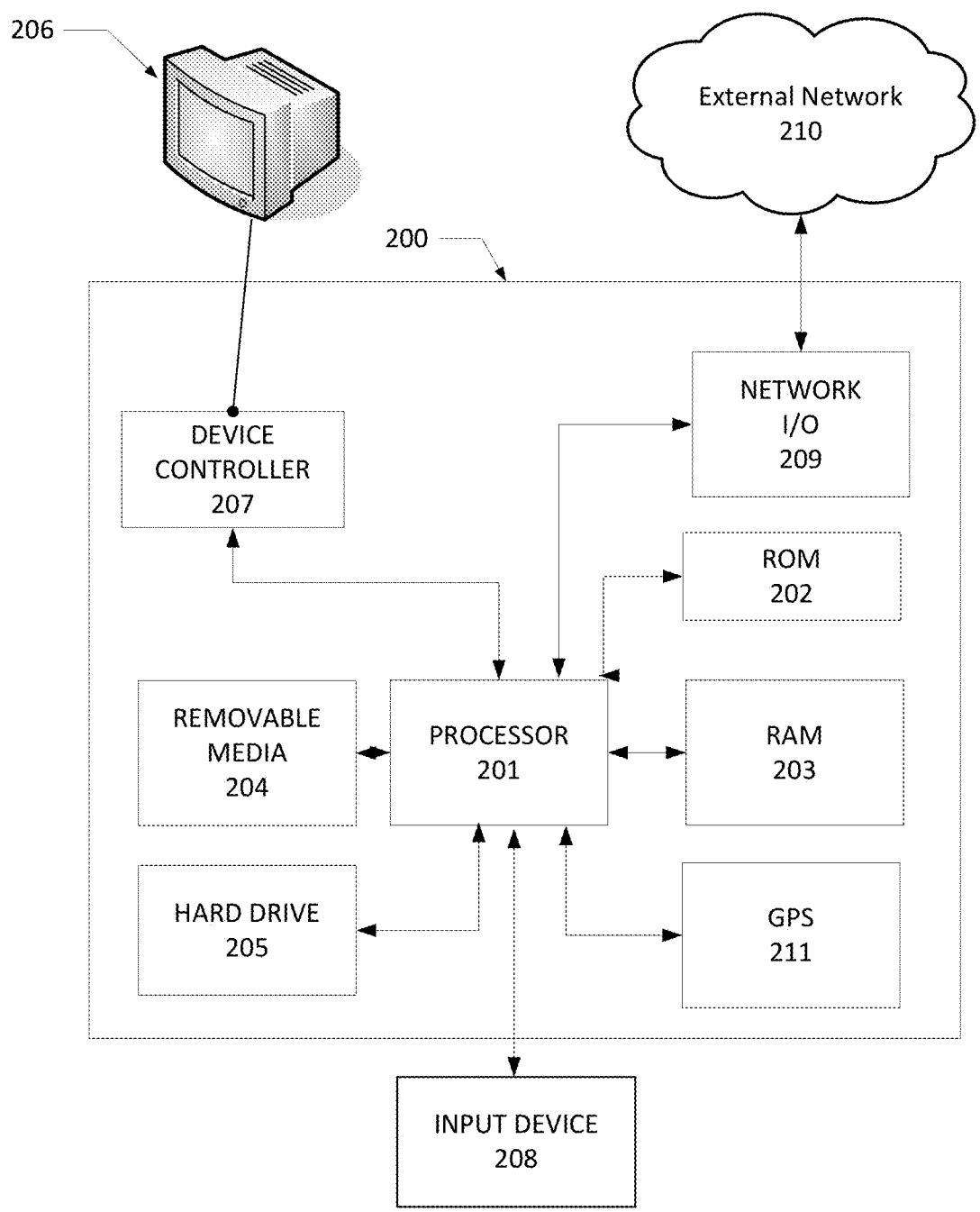
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
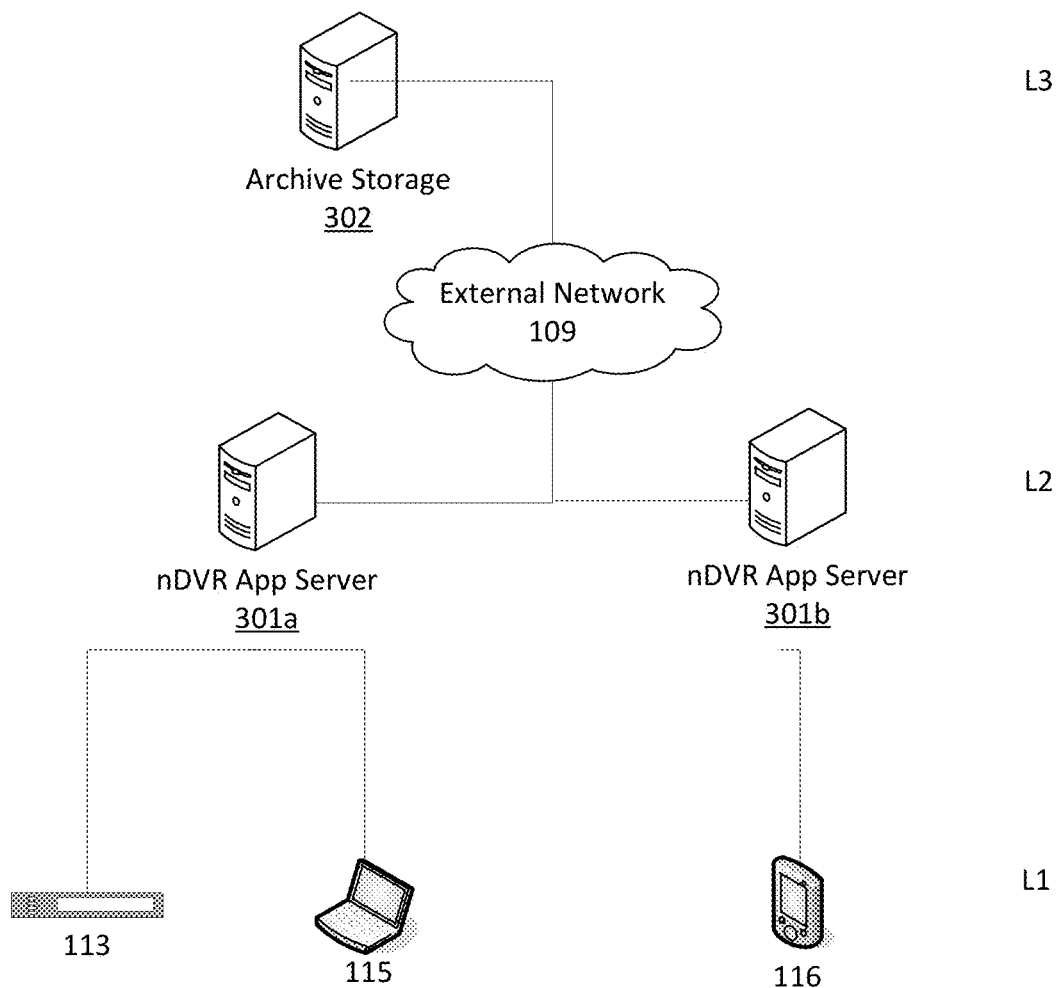
FIG. 3 illustrates an example content storage hierarchy.

Features described herein may involve a multiple-level hierarchy of storage devices that can be used to store a user's content. FIG. 3 illustrates an example hierarchy having three levels, L1, L2 and L3. The first level, L1, may be storage that is on or associated with a content consumption device that the user uses to consume content. For example, the hard drive storage on a user's DVR that is used to play recorded video programs, or the FLASH memory of a laptop 115 or tablet 116 computer, or a storage device associated with a local or home network. The L1 storage is quickly and easily accessible by the consumption device, which may also minimize the need for network bandwidth, but the storage capacity of the L1 storage is limited. Larger storages are available at other devices, such as a network computing device, e.g., DVR application server 301, which may be an application server 107 located at the local office 103. The nDVR server 301 may have a large array of storage capacity, such as multiple arrays of large hard drives, FLASH memories, and other forms of storage. The nDVR server 301 may be considered level 2, or L2, storage, as it is remote from the consumption device. When the user wishes to play back content that is stored in the L2 memory, the user's device may need to transmit a request to the server 301, and await response. The response time might only be a few seconds, but it is longer than the response time needed to access the L1 memory. As a tradeoff for the longer response time, the L2 memory offers greater storage capacity than is otherwise available on the L1 storage. The L2 memory can also consolidate duplicate storage, storing a common piece of content for multiple different consumption devices and/or L1 storages.

FIG. 3 shows yet another level of storage, referred to as the archive store 302 or third level L3. The L3 storage may offer even greater storage capacity than the L2 and L1 memories, and may further consolidate storage of content. When the user's consumption device desires to access content from the L3 archive, there may be a slightly greater delay that would be experienced with the L2 memory, to account for the time needed for the L2 memory to request and obtain the content from the L3 memory. Although three levels of storage are described herein as examples, any desired number of levels may be used.

Figure 4A:
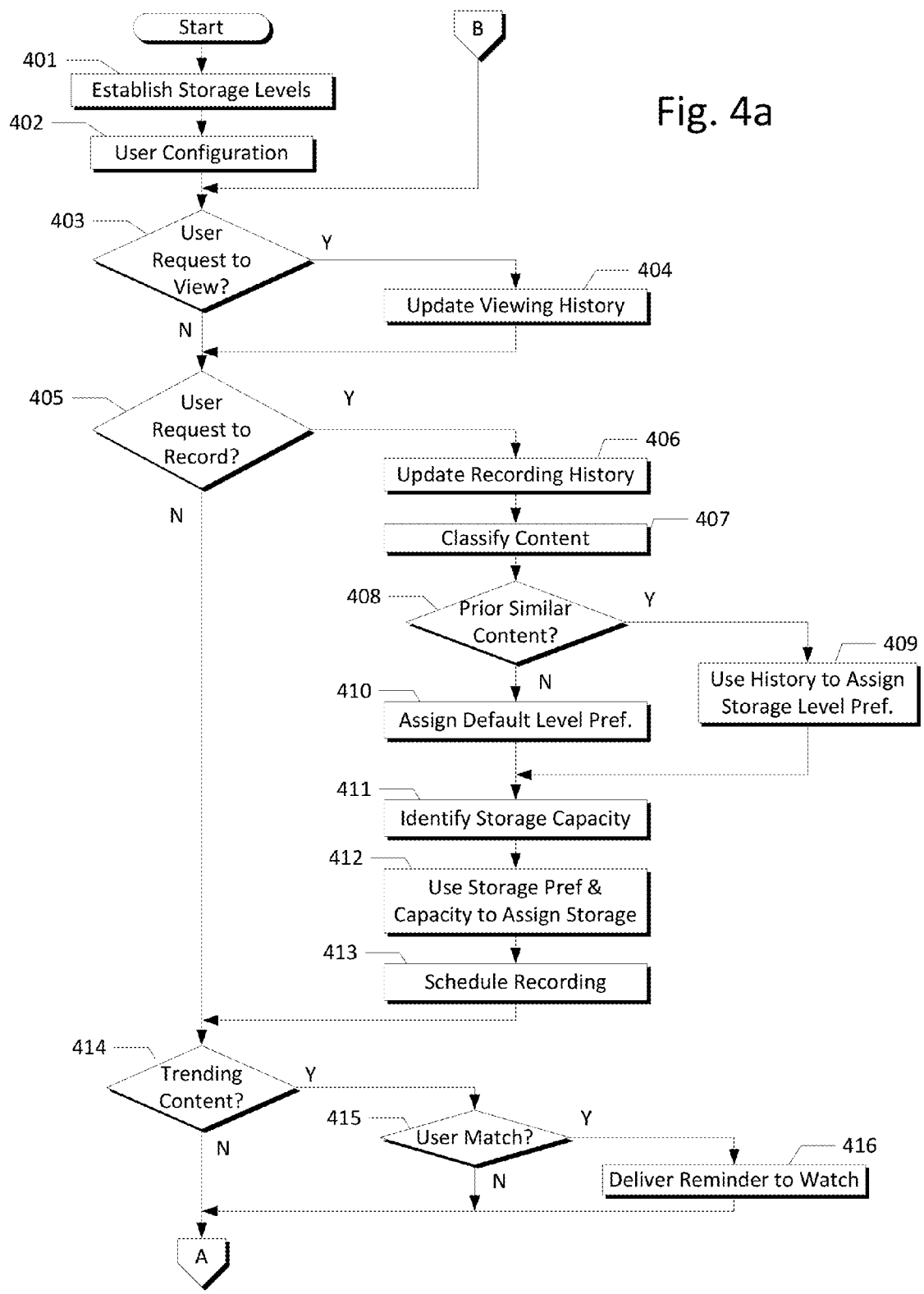
FIGS. 4a-b illustrate an example process flow for implementing various features described herein.
Figure 4B:
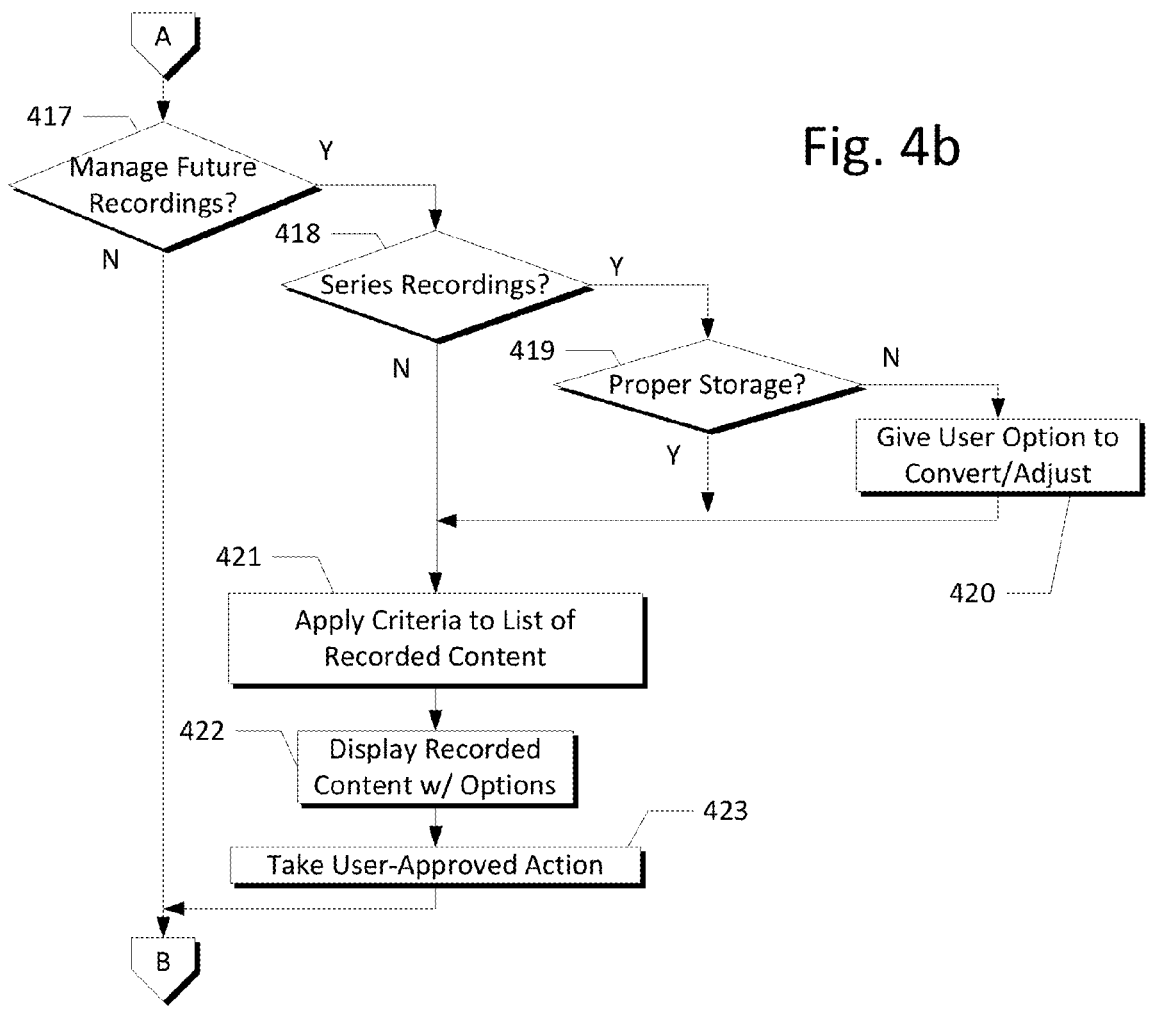

FIG. 4 illustrates an example process of managing the storage of content. The process may be performed by any computing device, such as the consumption device 113/115/116, nDVR application servers 301*a-b*, and archive storage 302 devices discussed above, alone or in combination. The discussion below refers to the steps being performed by one or a combination of these devices, but the system herein may be distributed among a variety of devices, and the steps may be performed by any other networked device if desired, so the description herein may simply refer to the system performing the various steps. In step 401, the various devices may establish or determine the existing L1, L2 and L3 storage levels and corresponding devices. Establishing the storage levels may involve configuring the various storage devices with their place in the hierarchy of content, providing them with the corresponding addresses of higher- and lower-level devices, identifying the content supported. In some embodiments, the configuration may include indicating whether local recordings should be done in parallel. For example, the storage may be configured such that when a recording is made on the L1 storage level, the same content may also be recorded (e.g., at the same time as the initial recording) at the L2 and/or L3 storage levels. Having this duplicate recording may help minimize network bandwidth if, for example, the system or user should subsequently request that L1 content be offloaded to L2 or L3 storage. When such a dual-recording is made, a request to transfer L1 content to the L2 or L3 storage may be handled by simply deleting the copy stored on the L1 storage. In some embodiments, the L1, L2 and L3 storage levels may have a size limit associated with them. For example, a user may have a first amount of storage (e.g., 20 GB) on the L1 device, a second amount of storage (e.g., 250 GB) on the L2 device, and a third amount of storage (e.g., 500 GB) on the L3 device. Alternatively, some users may be given a zero size limit for one or more of the storages. For example, a user might have an L1 size of zero, and may instead rely entirely on the L2 and/or L3 storages for recording content. These sizes may be assigned and/or discovered at installation. For example, a user may register a first device, and that device may be polled to identify an amount of L1 storage that the device will make available. The sizes of the L1, L2 and L3 storages may be modified over time. For example, if a storage is routinely under-used (e.g., it does not exceed 50% usage in a given polling period), its size can be reduced, and the storage space may be reallocated to another use (e.g., retasking an L2 storage to be used by a different user).

In step 402, the user may configure their account and devices for access. This configuration may include initially providing information identifying the user and the device(s)

that the user intends to use for consumption of content. The configuration may also include allowing the user to specify how long recordings are to be maintained in storage, and when the user wants to have content removed from the local L1 storage and, if desired, placed in the L2 or L3 storage. Another configuration parameter may identify whether the user wishes to be reminded to view recorded content, and if so, when the reminder should be sent (e.g., elapsed time from the recording), and how the reminder should be sent (e.g., pop-up on the display screen of a television, email, text message to a mobile device, etc.).

In step 403, the system monitors whether the user has requested to consume content (e.g., by receiving a request at the system), such as by viewing the scheduled broadcast of a television program, viewing a video on demand, or playing back content that the user a had previously requested to be recorded. The consumption can occur on any of the devices described above, such as a DVR, computer, tablet, smartphone, etc.

If the user has requested to consume content, then in step 404, the system may update stored information identifying the user's viewing or consumption history. For example, the viewing history information may identify the user, the title of the program viewed, the series to which it belongs (if any), the device used to view it, the genre of the content (e.g., comedy, drama, action, movie, serial, etc.). For content that was previously recorded upon request by the user, the stored viewing history information may identify a time elapsed between when the recording was made and when the user chose to consume it. For example, the history may indicate that the user watched the "Colbert Report" 14 hours and 13 minutes after it was recorded.

The viewing history may also identify the user's interaction with the content during and after viewing. For example, the history may identify a number of times that the user enters a pause or fast-forward command while viewing, or if the user requested or consumed any supplemental content associated with the content (e.g., a second-screen application on the same or a different consumption device), and may identify whether the user requested to keep the recording after it was watched (or if the user requested to delete it, or move it to L2 or L3, after the viewing; in some embodiments, moving between the storage levels may be automatically performed without informing the user—for example). The history may also identify how many times the user requested to view the content, and can store the same user interaction information for each of those viewing. Similarly, the history may identify how many times the user accessed supplemental content related to the content, and what the supplemental content was.

In step 405, the system may determine whether the user has entered a request to record a program. The record request may be, for example, entered by a user pressing a "Record" button while viewing a program, or by scheduling a future recording using a DVR interface.

If the user enters a request to record, then in step 406 the system may update a recording history maintained for the user. The recording history may be part of the viewing history, and may store information identifying the user's recording requests. The recording information may identify what programs the user has recorded, and when.

In step 407, the system may classify the content that the user has requested to be recorded. Classifying the content may include identifying a unique program identifier number or code, a program title, a series to which it belongs, a service that offers the program (e.g., NBC, HBO, ABC, channel 251, etc.), actors and producers of the program, a textual description of the program, the time and duration of the recording, a genre classification for the program (e.g., action, comedy, news, etc.), and any other desired characteristic of the program. This classification information may then be used in step 408 to determine whether the user has previously requested recording of a similar program to the requested program.

This similarity may be determined in a variety of ways. For example, the system may simply compare the series identifier of the requested program with the series identifiers from the user's recording history to determine if the user has previously recorded another program in the series. Alternatively, the system can compare program titles or program identifier numbers between the user's recording history and the recurring request to determine if the user has previously recorded the same program or a program having a title that is the same or nearly the same (within a predetermined degree of text comparison similarity) as the one about to be recorded.

If the user has previously recorded a similar program, then in step 409, the system can begin to determine a storage level preference for the requested recording. The storage level can be based, at least in part, on how the user actually used the similar content that was previously recorded. For example, if the new recording is part of a television series that the user has recorded, but the user has not yet watched any of the previously recorded episodes of the series, then the system may determine that the new recording should be of a lower level of importance, and can be stored at the L2 or L3 levels of storage, instead of the L1 level. The system may use a predetermined age between recording and viewing as a threshold to determine whether a new recording should be placed at the L1, L2, or L3 levels. For example, the system may determine that if a recording of the similar program was viewed within 1 day of when it was recorded, then it should be stored at L1. If the similar program was viewed between 1 and 7 days from when it was recorded, then the new recording should be stored at L2. If the similar program was viewed more than 7 days after its initial recording, or if it has not yet been viewed at all, then the new recording should be stored at L3. A data file for the system may identify programs with corresponding recording-to-viewing ages and recommended storage level treatment as follows:

| Program | L1 Age | L2 Age | L3 Age | Cancel | Series Conversion |
|---|---|---|---|---|---|
| Colbert Report (Series) | <1 day | 1-7 days | >7 days | None | L3 |
| Walking Dead (Series) | <7 days | 8-14 days | 15-21 days | >21 days | L2, L3 |
| Walking Dead (Episode) | <7 days | 8-14 days | >14 days | None | |

In the example table above, different program types may have different storage level treatments associated with them. For example, if a new series recording (e.g., a request to record future episodes in a recurring series) is determined to be similar to the first entry in the table ("Colbert Report (Series)"), then the recommended treatment is to store the new recording in L1 if the user's historical viewing habit has been to watch the recorded Colbert Report episodes less than one day after recording. However, if the user historically watches the recorded episodes between 1 and 7 days after recording, then the new recordings for the series should be stored in L2 storage because they are of lesser importance. If the user watches the recordings more than 7 days after recording, or none at all, then the new recordings should be stored in L3. The actual recording of the program can occur at the L1 system (e.g., the user's DVR), or it can occur at the L2 or L3 levels in the network (e.g., on a network DVR server).

There is also a series conversion recommendation of L3 listed for the first program. This may indicate that, if a new recording is determined to be destined for L3 storage (e.g., because the user historically has taken longer than 7 days to view the previous recorded episodes in the series), then the system may also display a message to the user, suggesting that the requested series recording actually be converted to a single-episode recording, to just record the next episode of the series instead of the whole series. The conversion may also include switching a series recording from recording all episodes to recording only the new episodes, omitting reruns. In some embodiments, this conversion may automatically be done, without needing a separate prompt to the user. In some embodiments, the conversion may be done automatically if the user's L1, L2, or L3 storage already exceeds a predetermined maximum storage amount.

As illustrated in the example, a different program series may have different criteria for the different levels of storage. For example, the "Walking Dead" series is a weekly program, while the "Colbert Report" is a daily program. This means that a recorded episode of the daily program causes the old, unwatched recordings to go stale faster than a recorded episode of a weekly program would. So the recording system may allow an episode of a weekly series to remain unwatched longer than an unwatched episode of a daily program, and remain in L1 storage. In the illustrated example, the daily "Walking Dead" series allows new recordings to be placed in L1 storage if prior episodes are unwatched for up to 7 days (instead of the 1 day allowed for the daily "Colbert Report"), while a recording-to-viewing age of 8-14 days would result in storage in L2, and 15-21 days would result in L3. This example also includes a value for canceling the recording if the recording-to-viewing age of prior episodes exceeds 21 days. When programs having this option have a recording-to-viewing age that exceeds 21 days, the system may recommend to the user that the series recording be canceled. The cancellation option may be useful for programs that are available through other means. For example, if the episodes are available on demand, or if the episodes are scheduled for repeat transmissions, then the user may wish to simply omit the recording of the series, particularly if available storage space is running low. This recommendation may occur immediately when the user enters the record request (e.g., "Your prior recordings in this series are over 21 days old. To save space, would you like to simply cancel this series recording? Episodes are available on demand, and the next episode will be re-run 3 times over the next week."). The illustrated example also has series conversion options for both L2 and L3, so if a user's recording ends up being recommended for L2 or L3 storage, then the user may be prompted to switch the requested series recording to an individual episode-only recording instead (or the conversion may be done automatically, as discussed above).

The data is not limited to series recordings. In the illustrated example, the third entry addresses recording requests for an individual episode of the "Walking Dead" program. In that example, if a user requests recording a single episode of that program, then users whose recording-to-viewing age of previous episodes exceeds 14 days would result in the recording being stored at L3 storage. In that example, there is no cancellation option or series conversion option.

The values in the data table may be modified in response to other factors. For example, the level of storage availability in the L1, L2 and/or L3 storages may cause the listed thresholds to change. For example, if the available space in the L1 storage for a given user exceeds 75%, then the overall system may be more lenient in allowing future recordings to be placed in L1 storage. In that example, the threshold values in the table may be increased, allowing future recordings to be placed in L1 even if prior recordings remained unwatched for longer periods of time (e.g., the L1 age of the "Colbert Report" may be increased from 1 day to 3 days). If the available space then drops below another threshold (e.g., below 50%), then the listed L1/L2/L3 thresholds may be adjusted downward, to encourage future recordings to move to the L2 and L3 levels.

The recording-to-viewing age of a particular program or series may be based on the age of a single recording (e.g., how long a particular recording waited before it got viewed), or it may be based on a plurality of recordings (e.g., the average time it took the user to watch the various episodes in the series). The recording-to-viewing age is one criterion on which the assignment of a future recording can be based. Another criterion may be the user's actual viewing percentage for series recordings. The actual viewing percentage may be a ratio of the number of recordings watched and the total number of recordings made for a particular series or group of content. For example, if a user records every episode of a given series, but only ends up watching a small percentage of the episodes, then that series recording might be relegated to an L2 or L3 storage level, saving room on the L1 storage for the series that the user watches more regularly. An alternative viewing percentage data table is shown below:

| Program | L1 % | L2 % | L3 % | Cancel | Series Conversion |
|---|---|---|---|---|---|
| Colbert Report (Series) | >75% | 50-74% | <50% | None | L3 |
| Walking Dead (Series) | >50% | 25-49% | 10-24% | <10% | L2, L3 |

In the illustrated example, the data table lists how the user's viewing percentages can affect the assignment of a storage location to the future recordings in the series. For example, for the "Colbert Report" example, if the user historically watched more than 75% of the recorded episodes of that program, then the future programs may be recorded to the L1 storage. However, if the user only watches less than 50% of the recordings, then the system may determine that future recordings in the series should be placed at the L3 level instead, and the user may also be prompted with a suggestion to convert the series recording to an individual episode recording instead. As for the "Walking Dead" series, the viewing percentage thresholds may be different, with a greater tolerance for a user not watching a recording. The difference in treatment may be due to a variety of factors, such as the frequency of the program (nightly versus weekly), duration of each episode, data file size of each episode, etc.

The recording-to-viewing age and viewing percentage data tables may each result in different recommendations for where a future recording should be placed, and ultimately these recommendations may be weighed together to arrive at an ultimate recommendation. Other factors, such as an extent to which the user engaged in supplemental content related to the primary content (e.g., if the user participated in an interactive game associated with a television program, or followed along with a second-screen experience application that is synchronized to a television program), may also be used in the determination of a storage recommendation. If a user participates in such supplemental content consumption for 75% of the episodes of one television series, and only does so for less than 10% of the episodes of another series, then the first series may be given a higher priority for local storage of the program and, if desired, its associated supplemental content.

After the various ages and factors have been evaluated in step 409, the requested recording may be assigned to the recommended storage level (e.g., L1, L2, L3). If there is no history of the user's viewing of similar content in step 408, then in step 410, the recording may be assigned to a default level (e.g., default to L1). The default may be based on user preferences established in the user configuration 402, and may be based on other factors such as the availability of storage space and/or bandwidth. For example, if space in L1 is running low (e.g., less than 20%), then the default for future recordings may be L2 or L3.

In some embodiments, the available storage capacity may be determined independently of the user's prior history. In such embodiments, step 409 may result in a recommendation that is not based on available storage levels, and which may identify a ranking of the storage levels (e.g., L2 preferred, then L3, and L1 last), and step 411 may involve determining how much storage capacity remains available. Step 412 may then use the recommended storage level ranking, and assign a storage level in view of the available storage. In doing so, the system may maintain another data table identifying storage capacity thresholds. For example, the data table may indicate that L1 is permitted if it is the top recommendation and if availability exceeds 20%, but if availability is below 20%, then the top ranked choice is denied. The second-ranked recommendation (e.g., L2), also have its own threshold, below which the choice is denied. Similarly, the third-ranked recommendation (e.g., L3) may have its own threshold as well, permitting recording only if availability exceeds, for example, 1%. If the final option is also denied, then the recording request might simply be denied.

Assuming there is room somewhere for the requested recording, then the requested recording will be assigned to one of the L1/L2/L3 storages, and in step 413 the recording is scheduled for the time/service/channel/storage level. As noted above, some embodiments may employ a dual-recording approach, in which requested content is recorded in multiple storage locations (e.g., recording a broadcast program in both L1 and L2 storages). For example, if a user watches a scheduled television program on a DVR, and his spouse watches the same content on a tablet computing device, then the DVR may record the program on its own L1 storage, while the same program is also recorded on an L2 storage due to the tablet computing device's consumption. If there is no room anywhere, then the recording may be denied.

Proceeding to step 414, the system may offer reminders to the user to watch unwatched content. In step 414, the system (e.g., an application server 107) may monitor one or more sources of popularity trends, to identify persons, actors, programs, movies, etc. that are in the news and/or otherwise are popular or topical (e.g., actors whose names are mentioned more than a predetermined number of times in a news program or in a social network feed, weekend box office winning movies may result in the movies' actors, producers, prequels being deemed popular, etc.). The sources of popularity may be, for example, entertainment news programs, social network conversation feeds, user viewing habits, box office receipts, or any other source of information to identify popular programs. From analyzing these sources of popularity, the system may identify programs, series, actors, and/or keywords that are deemed to be trending popularly. The identified popular elements may be identified by keywords and/or content identifiers, and then be compared 415 with a list of the user's stored unwatched recordings (and corresponding descriptive data identifying topics, actors, etc. of the program) to determine if there is a match.

Figure 5A:
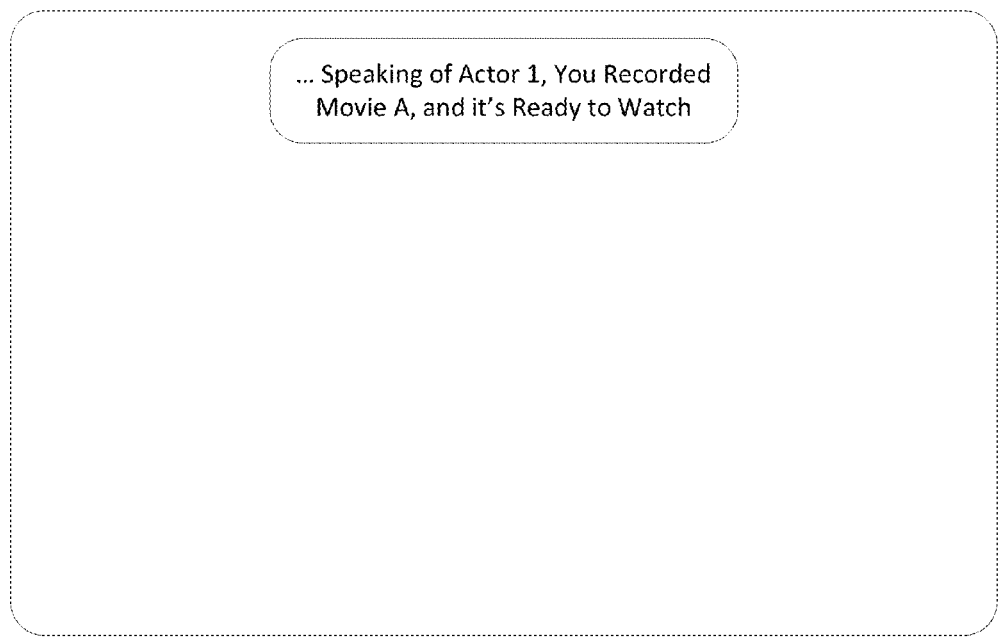
FIGS. 5a-b illustrate various example interface screens that may be presented to the user in aspects described herein.

If there is a match, then in step 416, the system may deliver a reminder to the user regarding the unwatched recorded program that is somehow related to a popularity trend. The reminder may be delivered in a variety of ways. For example, one such reminder may be a simple pop-up message appearing as an overlay atop a video program that the user may be watching. FIG. 5a illustrates an example of this, in which message 501 refers to an actor (Actor 1) who is also associated with the video program that the user is currently viewing. In some embodiments, the user may press an 'OK' button on a remote control, or otherwise select the pop-up (e.g., by touching it on a tablet display), to view a listing of the related recording(s), and to initiate playback.

Other forms of reminders may include an email message sent to a predetermined account, a phone call, a pop-up on a different device from one that is presenting the related video program (e.g., the user may be watching a movie with Actor 1 on a main television, and using a second-screen tablet computer to follow along with the movie's second-screen experience, and the reminder message may appear on the second-screen tablet's display), a message sent to a DVR inbox, or any other desired messaging platform. The user may establish these delivery mechanisms during the configuration step discussed above, and the system (or other device) may store data identifying the user's requested mode of content viewing reminders.

In some situations, there may be more than one matching program. For example, if a particular actor is prominently mentioned in the news, the system may look through a user's recordings to find programs involving that actor, and the system may find that the user has several recordings that all feature that actor. In some embodiments, the system's reminder could simply list all of those recordings. In other embodiments, the system may seek to prioritize the recommendations, to limit the number of reminders, and/or attempt to provide the most effective reminder that will result in a viewing. For example, if there are multiple matches with trending topics, then the system may select the one match that matched the most topics. Alternatively, the system can select the topic or keyword that had the most matches among the user's recordings, and then list all of the matching content in the reminder, along with an identification of the reason for the match (e.g., "You have the following 5 recorded unwatched items, all of which relate to Actor A."). In some embodiments, the reminders may be limited to only those topics that have a certain minimum number of matching recordings. For example, if Actor A is a popular trending topic, then the system might only offer a reminder if the user has at least 5 unwatched recordings matching that topic. In some embodiments, the reminders may be limited based on the size of the matching unwatched recorded content. For example, the system may refrain from sending a reminder if the matching content is under 1 MB of content.

In step 417, the system (or, as noted above, e.g., consumption device or any other device in the system, such as an application server 107) may determine whether it is time to manage, e.g., delete or relocate, the user's future recordings. This determination may be based on the passage of time. For example, the system may undergo the storage management process once per day. The determination may also be based on storage space, such that the storage management process is conducted whenever the availability of the L1, L2, or L3 storage drops below a predetermined threshold (e.g., below 20% available). The use may also request to manage the recording storage.

In step 418, the storage management process may begin by determining whether there are any scheduled future series recordings for the user. If there are series recordings, then the process may determine, in step 419, whether storage assignments for currently-scheduled series recordings is still proper. This determination may repeat the analysis discussed above involving the recording-to-viewing age and viewing percentage data tables, but with updated information regarding the user's viewing history and the available storage space. For example, if the user's series recording of the "Colbert Report" was previously assigned to L1 storage because the user consistently watched all episodes promptly after recording, but the user's more recent viewing history for that series becomes infrequent, such as watching less than 50% of the episodes, and only watching episodes on average more than 7 days after they were recorded, then the system may determine that the future episodes of this series should be placed in L3 storage instead of the currently-scheduled L1.

If the currently-assigned storage is no longer proper, then in step 420, the system may be identified as a series recording, e.g., in which future episodes in the series are scheduled to be recorded, that is a candidate for conversion of the recording from a series recording to just an individual episode recording, or to cancel it outright. A screen such as that shown in FIG. 5*b* may eventually be used to display the future scheduled recordings to the user, along with suggestions for altering the recording behavior. As illustrated, the scheduled Series Recording 1 510 may be provided with an option 511 to convert the recording to a one-time episode recording, along with an explanation for why the option is being provided. The screen itself may be provided as part of the user's DVR or recording schedule interface, which may be displayed by a DVR on the user's television, on a computing device, and/or made available at an Internet site that allows user interaction with the user's recording schedule and recorded contents.

Another example 512 series recording offers the option 513 of converting a series recording from recording all episodes to just recording only the new episodes, due to the available space running low.

The FIG. 5*b* screen illustrates additional examples of suggestions that may be provided to the user, and many of those options are discussed below. These options may be presented to the user with a listing of the user's recordings, and in generating the list, the system (e.g., the system, or an application server 107) may maintain an option parameter for each recording that is present in the user's L1, L2, and/or L3 allocated storage. The option parameter may identify one or more options that can be offered to the user, following processing of the criteria that are discussed below.

In step 421, a variety of criteria may be applied to the user's recordings, to assist in determining which pieces of content should be recommended for management, and what type of management should be applied. The discussion herein addresses a variety of criteria, and in implementation there need not be any one criterion that dominates the others. Instead, the various criteria may each be evaluated, and may each weigh in to the ultimate recommendation for a program. For example, the system may begin the evaluation by giving each of a user's existing recordings a default priority level (e.g., a 5 on a scale of 1-10), and then the evaluation of each individual criteria may adjust the priority up or down. When all criteria have been evaluated, then the system may rank the programs in order of their resulting priority, and may determine which ones stay at their respective levels based on the available storage. For example, if the L1 storage has room for 13 programs, then in the ranked priority list, the top 13 programs will be selected to remain in L1 storage, and the others relocated (or recommended for relocation) to the L2 or L3 storages.

One type of criteria is the size of the content. For example, moving large pieces of content may free up the most space, so there may be a preference for relocating larger pieces of content as opposed to smaller ones. The size may be measured in terms of playback duration time (e.g., 30-minute program), or it may be measured in terms of storage size (e.g., 2 GigaBytes of storage).

Another criterion may be the genre of the content. The genre may be any classification of the content, such as the program type (e.g., if it is a comedy, drama, action, news, music, etc. program).

Another criterion may be the age of the recording. The longer a piece of content has remained unwatched, the more likely it is that the user is no longer interested in watching it, so there may be a preference for relocating the older pieces of content before relocating the newer pieces of content.

Another criterion may be the recording-to-viewing age of programs that are similar to the unwatched recorded program, which was discussed above. If the user has recently watched programs that are in the same series, or even genre, as an unwatched recorded program, then there may be a preference to keeping that unwatched recorded program, as opposed to other unwatched recorded programs that belong to series or genres. Similarly, if there are two recorded, unwatched programs belonging to different two different series, and the user has recently watched episodes from one series but not the other, then that other series may be a better candidate for relocation.

Another criterion may be an indication of whether the user has already watched the recording. Given a choice between moving unwatched and watched recordings, there may be a preference for relocating (or even deleting) the one that has already been seen by the user, as the user might not be interested in keeping that one around any more. Similarly, another criterion applicable to series recordings is whether a more recent episode has already been viewed and/or deleted. For example, if 5 consecutive episodes of a daily news program are recorded, and the user has already watched the most recent one, then the earlier 4 unwatched episodes may be given a lower priority due to the fact that a newer episode has already been watched.

Another criterion may be the topicality of the content. The topicality may refer to how popular the content is, or is predicted to be, given the current time and/or date. For example, a Christmas movie may be more likely to be watched in November and December, and less likely to be watched in May or June. The data identifying the recorded content may also identify one or more times of year (or times of day) when the content is more expected to be of higher popularity than other times of year (or day). Alternatively, the textual description of the content, which may be commonly found in an electronic program guide (EPG), may contain keywords that are associated with different times of year (or day), such as "Octoberfest," "Halloween" and "Thanksgiving," and the system may associate those keywords with specific times of year (or day). During those specific times, the user's recordings that have those keywords may be given a higher priority, and be more likely to be kept in L1 storage, than other programs.

Similar to the topicality, another criterion may be the trending popularity of the content. The trending popularity may be as determined in step 414. The textual description of the program, or other biographical information about the program (e.g., its actors, directors, producers, sequels and prequels, etc.) may contain keywords or phrases that match popular keywords and phrases obtained from social media sites, news organizations, customer surveys, box office receipt totals, or any other source that identifies popularity. For example, if the most popular topic on a particular social network service involves Actor A, then that actor's work may be given a higher priority for staying in the L1 storage.

Another criterion may be user requests to prioritize (or demote) certain content. For example, the user may indicate that certain programs or content are to be prioritized over other programs or content. The user may indicate that episodes of "The Walking Dead" are to be given priority over episodes of the "Colbert Report," and that both of those series are to be given priority over all children's programming and cartoons.

Another criterion may be the availability from other sources. If a piece of content is available for streaming on demand, then it may be less necessary to keep that content on the user's L1 storage, and such content may be more likely to be relocated from the L1 storage than other programs that are not available through other sources like on demand streaming access.

Another criterion may be the source of the content, as some sources may be deemed a higher priority for retention than other sources. For example, recorded content that was purchased as a download, or content that was uploaded from the user's own video camera, or content that was downloaded from a friend of the user, may be given a higher priority for remaining in a user's L1 storage than content from other sources.

Another criterion may be whether the user has previously declined to relocate the particular recording. For example, if the user was previously given the suggestion of moving a recording from the L1 storage to the L2 storage, and declined, then the system may refrain from asking the user the same question. Accordingly, this criterion may result in recordings being omitted from the FIG. 5b screen. In some embodiments, the decision to move content between the L1 and L2/L3 storages need not involve the user. For example, content may be automatically moved due to other criteria, and in this situation, the prior decision on whether to relocate the content may inform the current decision.

The various criteria may be used in combination as well. For example, the system may store a data table identifying treatment using combinations of criteria as follows (in the example, increasing priority refers to increasing likelihood of remaining in L1 storage):

| Content Type/Size | Treatment |
| --- | --- |
| HD Movie Over 2 hours, unwatched for over 14 days | Decrease priority by 2 |
| Weekly episodes of "The Colbert Report" that are over a week old | Decrease priority by 3 |
| Unwatched weekly episodes of "The Colbert Report" that are less than a week old, with no more recent watched episode | Increase priority by 1 |
| Weekly episodes of "The Colbert Report" that are less than a week old, but where there is a more recent watched episode | Decrease priority by 2 |

After applying the various criteria, the system may have a relative priority for each recorded content, indicating its priority for management. A high priority recording may simply be allowed to remain where it currently is. A low priority recording may be a candidate for being relocated to a lower storage level (e.g., L1 to L2 or L3, L2 to L3) or for being rescheduled (e.g., series recording converted to just a single episode or new-only recording), and may have a variety of options for this management. In step 422, the FIG. 5b display illustrates an example of this listing, with some additional options beyond the series recording options discussed above. For example, Program A may be given the option to be deleted or archived (at the user's discretion) on the grounds that the recording has already been watched by the user. If the user selects this option, then the user may choose whether to delete the recording or to move it to a different level of storage.

Figure 5B:
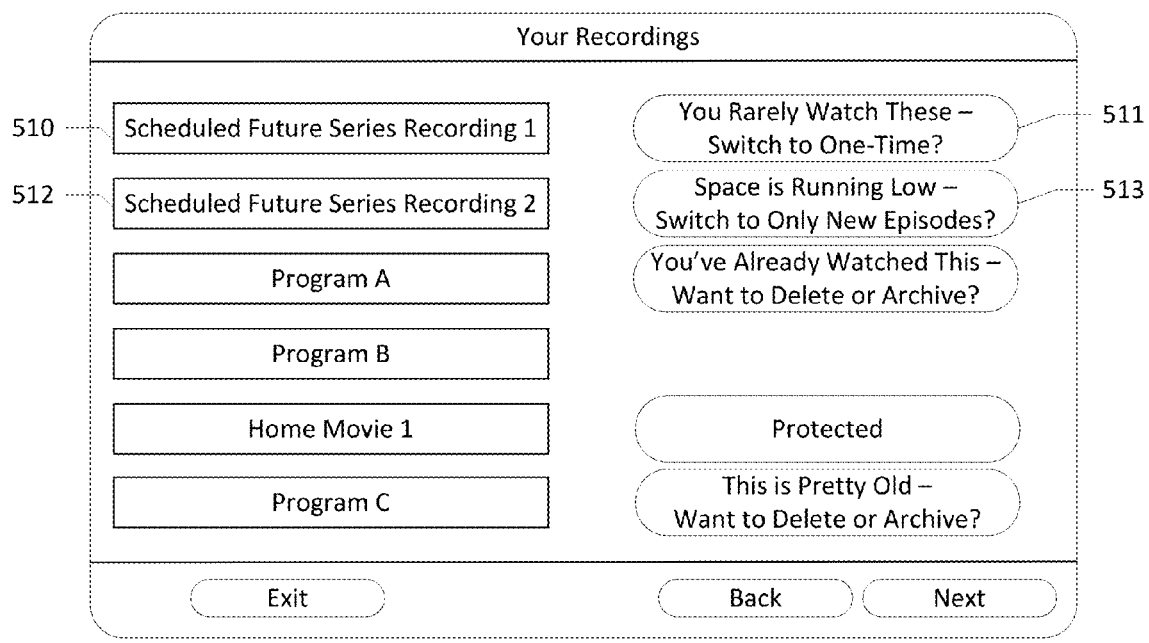

In the FIG. 5b example, Home Movie 1 is shown as protected, to indicate that this source (e.g., a user-uploaded home movie) may be allowed to remain where it is. Program C may be displayed with an option of deleting or archiving based on the age of the unwatched recording.

The user may select the one or more recordings that he/she wishes to delete or archive, and in step 423 the system may take the user-approved action. For example, if the user indicated that he/she would like to archive the Program C by moving it to L3, then this movement can be carried out in step 423. From there, the process may return to step 403 to continue for the next user request to view.

In some simpler embodiments, the system may simply rank recorded series according to the average time it takes the user to watch an episode of the series (or according to the priority above), examine the storage space needed by each episode, examine the available storage space in the L1 storage, and allow the top ranked recordings to remain in L1 until the available space is consumed. Once the space is consumed by higher-ranking content, the remaining content may be moved or recommended for movement to the L2 or L3 storage.

As noted above, if a user previously declined a suggestion to relocate a recorded program, then in future instances the system might not recommend relocating that recorded program. Similarly, user responses to other suggestions may also be monitored and tracked, and the user responses can affect the priority adjustments for the different criteria. For example, if the user consistently accepts the suggestion to archive episodes of weekly programs due to the age exceeding 7 days, then the priority adjustment for that criterion may be increased in the future, so that in future pruning efforts this criterion will have a greater effect on the suggestions given to the user. Similarly, the user may be given the option to have certain criteria ignored. If, for example, the user chooses to decline a suggestion to delete a program due to its age, the user may be given the option of checking a box to indicate that future pruning efforts should ignore the program's age (e.g., "ignore the age in the future"). The user may also be given the option to prevent the system from entering the pruning process.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. A method comprising:
   receiving, by a computing device, a user request from a user to schedule a recording of future content;
   determining a consumption history, of the user, of consuming one or more recordings of previous content related to the future content, wherein the previous content and the future content comprise different content, and wherein determining the consumption history comprises:
   determining a first number of recordings of previous content related to the future content that have been consumed by the user, and a second number of total recordings of previous content related to the future content that have been requested by the user; and
   determining a ratio of the first number and second number; and
   based on the consumption history, adjusting the recording of the future content by comparing the ratio with a threshold ratio corresponding to a first storage location and relegating the recording of the future content to a storage location when the ratio is below the threshold ratio corresponding to the first storage location.

2. The method of claim 1, wherein the previous content and the future content comprise different episodes of a same series.

3. The method of claim 1, further comprising storing a plurality of threshold ratios for each of a plurality of content, wherein each of the threshold ratios corresponds to a different storage for recording corresponding content.

4. The method of claim 1, wherein the consumption history further comprises an indication of whether the user consumed any supplemental content associated with the previous content.

5. The method of claim 1, wherein the determining the consumption history of the user further comprises determining a time elapsed between recording of, and consumption of, by the user, each of the one or more recordings of previous content related to the future content.

6. The method of claim 5, wherein the determining the consumption history of the user further comprises averaging multiple elapsed times between recording of, and consumption of, by the user, a plurality of recordings of the previous content related to the future content.

7. The method of claim 1, wherein adjusting the recording of the future content further comprises adjusting a frequency with which the recording of the future content is performed.

8. The method of claim 7, wherein the user request is for a series recording of multiple episodes in a first series of episodic content, and wherein adjusting the frequency comprises converting the series recording from a first mode in which all episodes of the first series are to be recorded, to a second mode in which only new episodes of the first series are to be recorded.

9. The method of claim 7, wherein the user request is for a series recording of multiple episodes in a first series of episodic content, and wherein adjusting the frequency comprises converting the series recording from a first mode in which multiple episodes of the first series are to be recorded, to a second mode in which only a single episode of the first series is to be recorded.

10. A method, comprising:
    receiving, by a computing device, a user request from a user to record a future episode of a recurring series;
    determining a storage level for the future episode by determining an amount of time that passed between a recording of a prior episode of the recurring series and the user consuming the recording of the prior episode of the recurring series, and comparing the amount of time with a data file indicating a plurality of storage levels and corresponding recording-to-viewing-ages; and
    scheduling the future episode for recording at the storage level.

11. The method of claim 10, further comprising:
    determining the storage level for the future episode further based on a determination of whether the user has any unwatched prior episodes of the recurring series recorded by the computing device.

12. The method of claim 10, further comprising providing a user message suggesting that a requested series recording be converted from an all-episodes recording to an only-new-episodes recording based on the determination of how the user has consumed prior episodes of the recurring series.

13. The method of claim 10, wherein the data file further comprises information indicating a plurality of series, and for each of the plurality of series, a corresponding set of recording-to-viewing ages and corresponding storage levels.

14. The method of claim 13, wherein the data file further comprises a first set of recording-to-viewing ages for the recurring series, and a second set of recording-to-viewing ages for individual episodes of the recurring series.

15. A method, comprising:
    generating a consumption percentage data table indicating a plurality of sequential series, and for each sequential series, a plurality of consumption percentage ranges and corresponding storage locations;
    receiving, by a computing device, a user request from a user to make a recording of a video program that is an episode of a sequential series of episodes;
    determining a location to store the recording of the video program by comparing a determination of how the user has consumed one or more sequentially preceding episodes of the sequential series of episodes with a corresponding plurality of consumption percentage ranges from consumption percentage data table; and
    scheduling the recording of the video program at the location.

16. The method of claim 15, wherein the determination of how the user has consumed one or more sequentially preceding episodes of the sequential series of episodes comprises a determination of a ratio of a first number of episodes of the sequential series of episodes that the user has consumed to a second number of total episodes of the sequential series of episodes that have been recorded for the user.

17. The method of claim 15, wherein determining the plurality of consumption percentage ranges for each sequential series of episodes comprises determining an airing frequency of each sequential series of episodes.

18. The method of claim 15, wherein determining the location to store the recording of the video program further comprises determining whether the user consumed any supplemental content associated with a recording of a previous episode of the sequential series of episodes.

19. The method of claim 15, wherein determining the location to store the recording of the video program further comprises determining an amount of time that passed between a recording of a previous episode of the sequential series of episodes and the user consuming the recording of a previous episode of the sequential series of episodes.

20. The method of claim 19, further comprising comparing the amount of time with a data file indicating a plurality of storage levels and corresponding recording-to-viewing ages.

\* \* \* \* \*